(12) United States Patent
Konstadinidis et al.

(10) Patent No.: US 8,351,749 B2
(45) Date of Patent: Jan. 8, 2013

(54) OPTICAL FIBER COATING WITH A COLOR CONCENTRATE HAVING SLICKNESS ADDITIVE

(75) Inventors: Kariofilis Konstadinidis, Decatur, GA (US); Harry Garner, Lawrenceville, GA (US)

(73) Assignee: OFS Fitel, LLC, Norcross, GA (US)

( * ) Notice: Subject to any disclaimer, the term of this patent is extended or adjusted under 35 U.S.C. 154(b) by 371 days.

(21) Appl. No.: 12/640,224

(22) Filed: Dec. 17, 2009

(65) Prior Publication Data
US 2011/0150404 A1 Jun. 23, 2011

(51) Int. Cl.
*G02B 6/02* (2006.01)
(52) U.S. Cl. ......... 385/128; 385/123; 385/126; 385/127
(58) Field of Classification Search .................. 385/123, 385/126, 127, 128
See application file for complete search history.

(56) References Cited

U.S. PATENT DOCUMENTS

| | | | |
|---|---|---|---|
| 5,074,643 A | 12/1991 | Petisce | |
| 5,621,838 A | 4/1997 | Nomura | |
| 6,130,980 A | 10/2000 | Murphy et al. | |
| 6,317,553 B1 | 11/2001 | Harper, Jr. et al. | |
| 6,321,014 B1 | 11/2001 | Overton et al. | |
| 6,797,740 B2 * | 9/2004 | Abel et al. | 522/81 |
| 6,991,679 B2 | 1/2006 | Kenkare et al. | |
| 7,174,079 B2 | 2/2007 | Abel et al. | |
| 7,591,904 B2 | 9/2009 | Bertz et al. | |
| 2001/0024698 A1 | 9/2001 | Lin et al. | |
| 2002/0099110 A1 | 7/2002 | Norlin et al. | |
| 2004/0037521 A1 | 2/2004 | Xiong et al. | |
| 2004/0062501 A1* | 4/2004 | Abel et al. | 385/128 |
| 2005/0084224 A1 | 4/2005 | Greer | |
| 2008/0227006 A1 | 9/2008 | Schwartz | |

FOREIGN PATENT DOCUMENTS

| | | |
|---|---|---|
| EP | 0473643 B1 | 12/1994 |
| EP | 1408017 A2 | 4/2004 |
| EP | 1640347 | 3/2006 |
| WO | 9850317 | 11/1998 |
| WO | 0147823 | 7/2001 |
| WO | 0201675 | 1/2002 |
| WO | 2009015695 | 2/2009 |

OTHER PUBLICATIONS

European Search Report for EP 10153635.7 dated May 31, 2011.

* cited by examiner

*Primary Examiner* — Jennifer Doan
(74) *Attorney, Agent, or Firm* — Sutherland Asbill & Brennan (57) ABSTRACT

Certain embodiments of the invention may include systems and methods for coating an optical fiber. The method includes coating an optical fiber with a primary coating, preparing a secondary coating by selectively mixing a concentrate with an ultraviolet (UV) curable diluent coating, wherein the concentrate comprises predetermined amounts of a color agent and a release agent, and applying the secondary coating to the optical fiber and primary coating.

5 Claims, 5 Drawing Sheets

OPTICAL FIBER COATING WITH A COLOR CONCENTRATE HAVING SLICKNESS ADDITIVE

FIELD OF THE INVENTION

This invention generally relates to optical fiber coloring, and more particularly to a slickness additive in the optical fiber color concentrate.

BACKGROUND OF THE INVENTION

Commercial optical fiber communication systems often require multiple fiber spans between plants to meet bandwidth and channel count demands. Since the optical cables that connect one plant to another are expensive to install, the cables often include multiple fibers, with some of the fibers (often called dark fibers) designated for future expansion or for redundancy. A typical optical cable can contain multiple ribbon fiber arrays, where each ribbon can contain multiple fibers. The cable can also contain multiple loose fibers in a loose-tube configuration. It is therefore understandable that the individual optical fibers require a unique visual identifier or color to be able to distinguish one optical fiber from the next in the cable.

Ribbon fibers contain multiple optical fibers, usually arranged side-by-side in a linear array, and the multiple fibers are surrounded by a matrix material operable to bind and protect the multiple fibers. However, the matrix material must also be able to peel away and separate from the individual fibers without excessive force that may cause damage to the optical fibers. Furthermore, if multiple optical fibers are placed in a loose tube, they must be able to independently slide against one another to avoid losses and dispersion due to binding stresses. To address both of these needs, optical fiber can be manufactured with a slick coating or release agent on the outer layer of the fiber to inhibit bonding with a ribbon matrix, or to allow loose tube fibers to slide against one another without binding.

To reduce the cost and additional off-line processes associated with the production of colored optical fiber with a slick coating, manufacturers have devised in-line dies and UV curing ovens that can coat the optical fiber with a colored coating having a release agent during the final stages of the draw process. Conventional colored secondary coatings have been formulated to include 1% to 20% reactive slickness additive. The simultaneous drawing, coating, and coloring of the fiber helps eliminate the time and cost associated with off-line coloring process. However, to maximize draw tower utilization, optical fiber manufactures often must produce colorless optical fiber for inventory so that it can be colored as needed later or sold to third party cable manufacturers. Therefore, a need remains for improved systems and methods for providing an optical fiber coating with a color concentrate having a slickness additive.

BRIEF SUMMARY OF THE INVENTION

Some or all of the above needs may be addressed by certain embodiments of the invention. Certain embodiments of the invention may include systems and methods for providing an optical fiber coating with a color concentrate having a slickness additive.

According to an example embodiment of the invention, a method for coating an optical fiber is provided. The method includes coating an optical fiber with a primary coating, preparing a secondary coating by selectively mixing a concentrate with an ultraviolet (UV) curable diluent coating, wherein the concentrate comprises predetermined amounts of a color agent and a release agent, and applying the secondary coating to the optical fiber and primary coating.

According to another example embodiment, an optical fiber draw tower is provided. The draw tower includes a primary die system operable to apply a primary coating to an optical fiber and a secondary die system for applying a secondary coating over the primary coating. The secondary die system comprises one or more valves or pumps operable to selectively combine a UV curable diluent coating with a concentrate, wherein the concentrate comprises predetermined amounts of a color agent and a release agent. The secondary die system also comprises an inline mixer operable to prepare a secondary coating by mixing the combined UV curable diluent coating and the concentrate and a coating die operable to apply the secondary coating to the optical fiber.

According to another example embodiment, an optical fiber is provided. The optical fiber includes a primary coating covering an optical core and a secondary coating covering the primary coating, wherein the secondary coating comprises a concentrate and a UV curable diluent coating, wherein the concentrate comprises a release agent in the amount of about 20% to about 40% by weight.

According to another example embodiment, a radiation-curable color concentrate for mixing with a secondary coating material during an optical fiber draw process is provided. The concentrate includes: about 20% to about 50% by weight of a coloring agent effective for coloring the optical fiber, about 20% to about 40% by weight of a release agent effective for creating a slick outer surface on the optical fiber, and about 20% to about 50% by weight of a UV curable diluent coating material effective as a base for the coloring agent and the release agent. According to example embodiments of the invention, the release agent may include reactive silicone- or fluorocarbon-based materials.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention enable selectively coating an optical fiber either with, or without color. For example, when the process is selected for coloring the fiber, a clear base coating can be mixed with color concentrate having a concentrated slickness additive or release agent just before applying the mixture to the fiber. The color concentrate can include a coloring agent operable to facilitate identification of the fiber, and a release agent operable to facilitate separation of the fiber from a ribbon matrix or to impart slickness to the coating surface for use in loose tube installations. However, when the process is selected for making colorless fiber, according to an example embodiment of the invention, the color concentrate (having the slickness additive) can be turned off and the fiber can be coated with the colorless base coating to produce colorless fiber with a predetermined amount of release agent (or no release agent). Therefore, the amount of release agent in the clear base coating can be independently optimized to facilitate adhesion of an additional coloring layer that can be applied to the fiber off line.

In accordance with example embodiments of the invention, the concentration of the slickness additive in the colored concentrate can be predetermined so that when the concentrate is diluted by mixing with the colorless base UV curable coating to make colored fiber, the resulting fiber surface has the appropriate amount of release or slickness agent present to impart the desired qualities for ribbon fiber or loose tube cabling.

UV coloring inks for offline coloring of optical fibers can contain about 1-20% reactive slickness additive which reacts with the polymer network during UV curing, but also modifies the surface to be slick enough for release from a ribbon matrix. UV inks applied as tertiary layers after draw are typically 5 to 7 microns thick to provide for adequate color intensity for easy fiber identification. However, the thickness of the colored secondary layer, according to an example embodiment of the invention, may be approximately 4 to 5 times thicker than conventional tertiary color layers. For example, the secondary coating in a 245-micron diameter optical fiber is typically 25 to 30 microns in thickness, or about 4 to 5 times thicker than the tertiary color layer. This 25 to 30 micron thick secondary layer can therefore be colored with a diluted version of the inks used in offline coloring to facilitate identification of the fiber instead of relying on the tertiary layer for coloring. Standard concentrated offline UV ink formulations may be suitable candidates to be used as color concentrates because their viscosity and pigment concentration have been optimized so that pigment particles do not settle during use (typically 24 to 72 hours after mixing). According to an example embodiment of the invention, the slickness or release agent additive concentration may be increased in the color concentrate so that the resulting, thick, diluted secondary coating has adequate slickness at the surface of the colored secondary layer.

In accordance with embodiments of the invention, colored concentrate may be mixed with a clear secondary (UV curable diluent) to impart a linear color density in the thick secondary coating of the fiber similar to the net color density in a conventional thin layer tertiary color coating. According to example embodiments of the invention extra slickness additive may be added to the color concentrate rather than to the bulk clear secondary (UV curable diluent) so that clear fiber can selectively be made without the additional slickness additive.

In an exemplary embodiment of the invention, a concentrate comprising concentrated color pigments (or dyes) and concentrated release agent material may be selectively mixed with the UV curable diluent coating. The concentrate may comprise release agent in an amount of about 20% to about 40% by weight. In another embodiment, the concentrate may comprise release agent in the amount of 10% to 50% by weight. In accordance with example embodiments of the invention, the secondary coating may comprise a mixture of about 20% to about 30% of the concentrate by weight. In another embodiment, the secondary coating may selectively comprise a mixture of about 0% to about 40% of the concentrate by weight. According to example embodiments of the invention, the colored secondary coating may be prepared by inline mixing of the concentrate and UV curable diluent coating. In accordance with example embodiments of the invention, the secondary coating may be prepared by inline mixing of the concentrate and UV curable diluent coating. According to example embodiments of the invention, at least one of the primary and secondary coatings may be UV curable.

In accordance with example embodiments of the invention, an optical fiber can be provided having a secondary coating that comprises a concentrate and a UV curable diluent coating, wherein the concentrate may comprise a release agent in the amount of about 20% to about 40% by weight. In an example embodiment, the concentrate may comprises a coloring agent effective for coloring the fiber in the amount of about 20% to about 50% by weight. In other example embodiments, the fiber secondary coating may comprise a concentrate in an amount of about 20% to about 30% concentrate by weight. In other example embodiments, the fiber secondary coating may comprise the concentrate in an amount of about 0% by weight for selectively producing colorless fiber.

According to example embodiments of the invention, the release agent may comprise one or more of silicone acrylates, silicone oils, fluorocarbons, fluorocarbon oils, or fluorocarbon acrylates. Other types of silicones and fluorocarbons having functional groups that can undergo free-radical or addition reactions with acrylates (e.g., thiol-functional, vinyl-functional, vinyl ether functional) may also be utilized for release agent materials.

According to exemplary embodiments of the invention, the coating materials can be colored with pigments or dyes. Example embodiments that utilize colored pigments may include coating materials having pigment particles dispersed in a suitable liquid carrier, for example, an organic binder resin or a UV curable polymer. Embodiments that utilize dyes may include coating materials having polymeric colorants that, for example, comprise macromolecular chromophore-containing molecules. In these example materials, an organic dye unit may be linked chemically to a polymer chain, and may be referred to as a polymeric dye. In other example embodiments, non-polymeric dyes could be used to provide the coloring.

According to example embodiments of the invention, various concentration mixtures and coating application systems for selectively coloring the optical fiber with a release agent will now be described with reference to the accompanying figures.

Figure 1A:
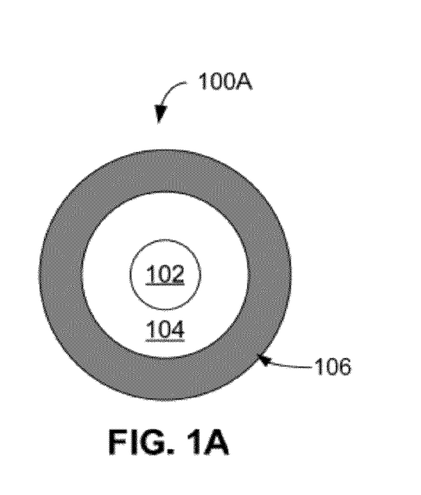
FIG. 1A through FIG. 1D are cross sectional views of illustrative coated optical fibers, according to example embodiments of the invention.

FIG. 1a illustrates an example cross-sectional view of a coated optical fiber 100A having an optical fiber core 102, a colorless primary coating 104, and a colored secondary coating with a release agent 106. According to example embodiments, the optical fiber core 102 may comprise an optical waveguide. According to other example embodiments, the core 102 may comprise an optical waveguide surrounded by a cladding material. According to example embodiments of the invention, the colored secondary coating with a release agent 106 may be prepared online during the fiber draw process by selectively mixing a pre-prepared concentrate with a UV curable diluent prior to applying the colored secondary coating to the optical fiber. The concentrate may include about 20% to about 50% by weight of color pigments, and about 20% to about 40% by weight of release agent.

Figure 1B:
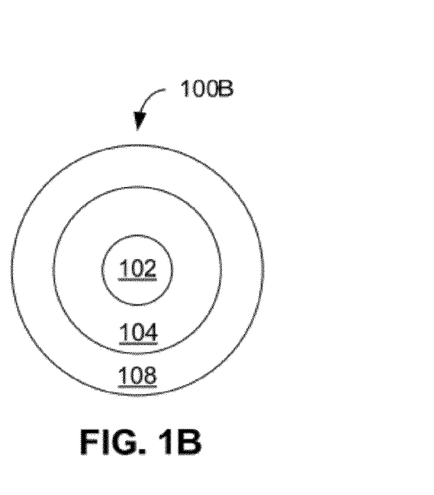

According to example embodiments of the invention, about 20% to about 30% by weight of the colored concentrate with the release agent may be mixed with about 80% to about 70% by weight of UV curable diluent coating material when colored fiber is desired, as shown in FIG. 1A. However, as shown in FIG. 1B, when colorless fiber is desired, the concentrate may be turned off and only the UV curable diluent coating may be applied to the optical fiber. In this case, the resulting optical fiber 100B may be coated with a colorless secondary coating 108 without release agent, which may allow the optical fiber to be colored in an off-line process since the absence of a release agent in the outer layer enables a subsequent colored layer to adhere to the optical fiber.

Figure 1C:
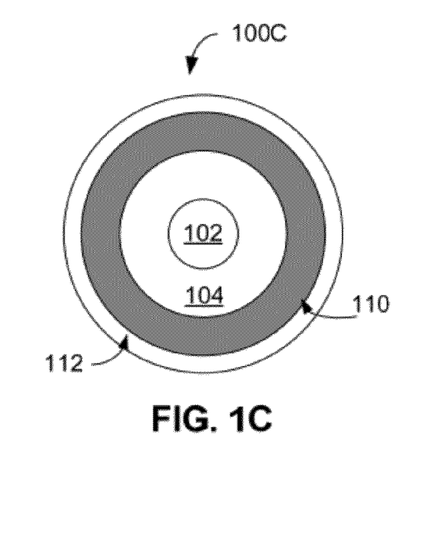

FIG. 1C depicts another example embodiment of the invention, where a coated optical fiber 100C is prepared using a colored secondary coating 110 without release agent. In this embodiment, a colorless tertiary coating 112 with release agent may cover the colored secondary coating 110 without release agent to provide the desired release function on the outer layer. This embodiment may provide some cost savings in that the release agent does not need to be present in the colored layer. However, an extra on-line applicator die may be added to the in-line coating process or the colorless tertiary coating 112 with release agent may need to be applied to the optical fiber off-line.

Figure 1D:
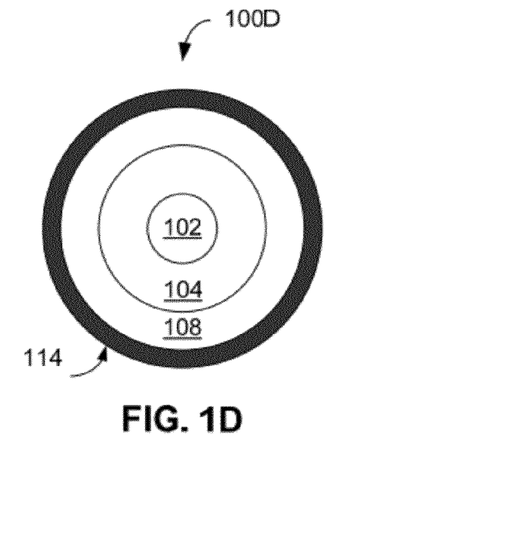

Another example embodiment of the invention is depicted in FIG. 1D, where a colored-concentrated tertiary coating 114 with release agent is applied to the outer layer of a coated optical fiber 100D having a colorless secondary coating 108. In this embodiment, the colorless secondary coating 108 may have a predetermined amount of release agent (or no release agent) so that the colored tertiary coating 114 with release agent may adhere to the colorless secondary coating 108. This embodiment may necessitate an extra on-line applicator for the in-line coating process, or the colored tertiary coating 114 with release agent may need to be added off-line.

Figure 2:
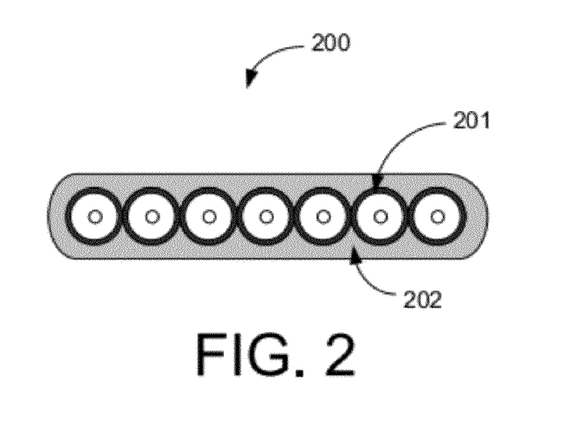
FIG. 2 is a cross-sectional view of an illustrative ribbon fiber end-view according to an example embodiment of the invention.
Figure 3:
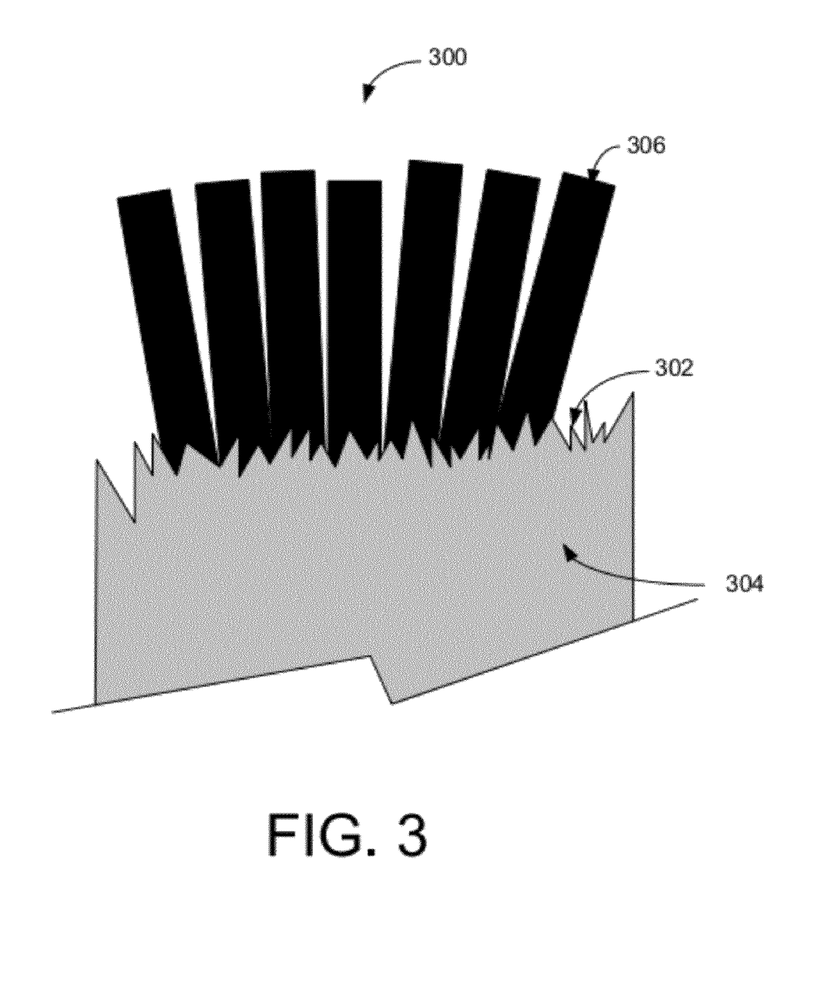
FIG. 3 is a top plan view of an illustrative ribbon fiber according to an example embodiment of the invention.

FIG. 2 illustrates a cross-sectional view of an optical fiber ribbon cable 200, where the coated optical fibers 201 may be surrounded by a ribbon matrix 202 material. According to an example embodiment of the invention, the coated optical fibers 201 may include a colored secondary coating with release agent that facilitates separation of the coated optical fibers 201 from the ribbon matrix 202. An example ribbon cable 300 with separated and exposed fibers 306 is depicted in FIG. 3. According to an example embodiment, a ribbon matrix 304 may be peeled back to line 302 to expose the coated optical fibers 306. The use of the release agent in the outer coating of the coated optical fiber 306 may facilitate the release of the ribbon matrix 304 from the optical fibers so that the individual fiber ends can be separated from the matrix and terminated as needed.

Figure 4:
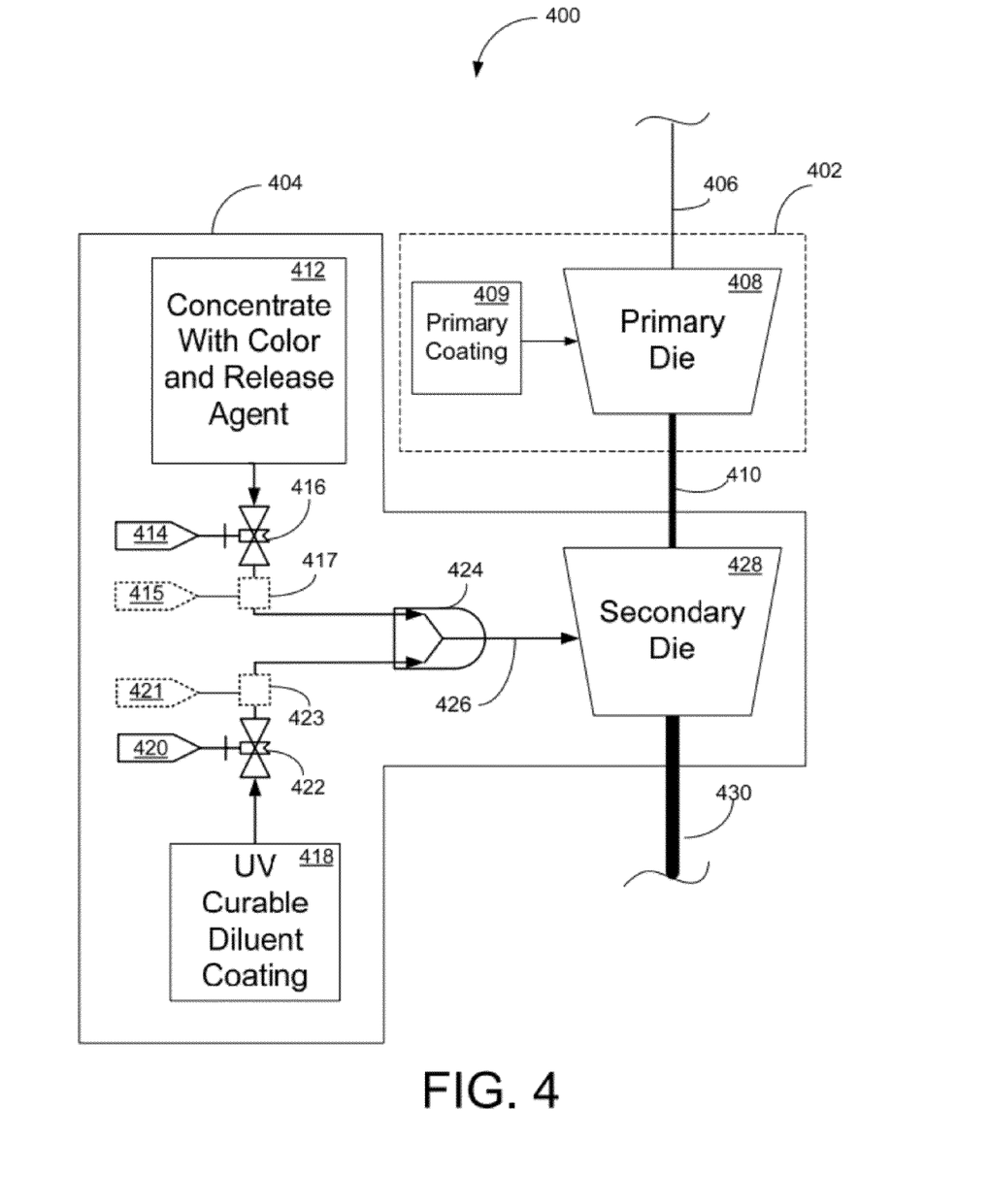
FIG. 4 is a block diagram of an illustrative fiber coating system, according to an example embodiment of the invention.

FIG. 4 depicts an in-line primary and secondary coating system 400, according to example embodiments of the invention. The system 400 may include a primary coating system 402 and a secondary coating system 404. In this example embodiment, an optical fiber draw tower may produce a drawn optical fiber core 406 that may be coated with a colorless primary coating 409 using a primary coating die 408. The resulting drawn fiber 410 with a primary coating may then enter the secondary coating die 428 to produce a drawn fiber 430 with a primary and secondary coating, where the secondary coating surrounds the primary coating.

In accordance with example embodiments of the invention, the secondary coating die 428 may be part of the secondary coating system 404. The secondary coating system 404 may include a container or pressure vessel operable to hold and disperse concentrate with color and release agent 412. In accordance with an example embodiment of the invention, a concentrate valve 416 may open or close in response to a concentrate valve control signal 414 that may be provided, for example, by a draw tower controller. The secondary coating system may also include a container or pressure vessel operable to hold and disperse a UV curable diluent coating 418. The UV curable diluent coating 418 may be a radiation curable material that is compatible with the concentrate 412. The UV curable diluent coating 418 may also be operable to selectively form a coating with or without the concentrate 412 present. A diluent coating valve 422 may open or close in response to a diluent valve control signal 420 that may be provided, for example, by a draw tower controller.

According to example embodiments of the invention, a concentrate metering pump 417 controlled by a concentrate metering pump signal 415 may be used in addition to, or in place of, the concentrate valve 416. Likewise, according to an example embodiment of the invention, a diluent metering pump 423 controlled by a diluent metering pump signal 421 may be used in addition to, or in place of, the diluent valve 422. Accordingly, in the example embodiments involving metering pumps 417 423, the secondary coating mixture 425 proportions of diluent 418 and concentrate 412 can be continuously controlled via the metering pumps 417 423 and the control signals 415 421.

According to an example embodiment of the invention, when the concentrate valve 416 and the diluent valve 422 are both open, (or alternatively, when the metering pump 417 423 are pumping both diluent 418 and concentrate 412) an in-line mixer 424 may mix the UV curable diluent coating 418 with the concentrate 412 to produce a colored secondary coating mixture 426 with release agent. The secondary coating mixture 426 may then be applied to the drawn fiber with primary coating 410 by the secondary coating die 428 to produce a coated optical fiber with a colored secondary coating 430 having release agent. However, according to another example embodiment of the invention, when colorless fiber is desired (e.g., the concentrate valve 416 is off, or the concentrate metering pump 417 is off), the UV curable diluent coating 418 may pass through the in-line mixer 424 without mixing with the concentrate 412. Therefore, in this case, the UV curable diluent coating 418 may be applied to the drawn fiber with primary coating 410 via the secondary coating die 428 and a colorless coated optical fiber without a release agent. Therefore, in accordance with example embodiments of the invention, the properties of the optical fiber secondary coating can be selectively controlled and produced in-line during draw without having to interrupt the draw process by selective operation of valves 416 422 or metering pumps 417 423.

Figure 5:
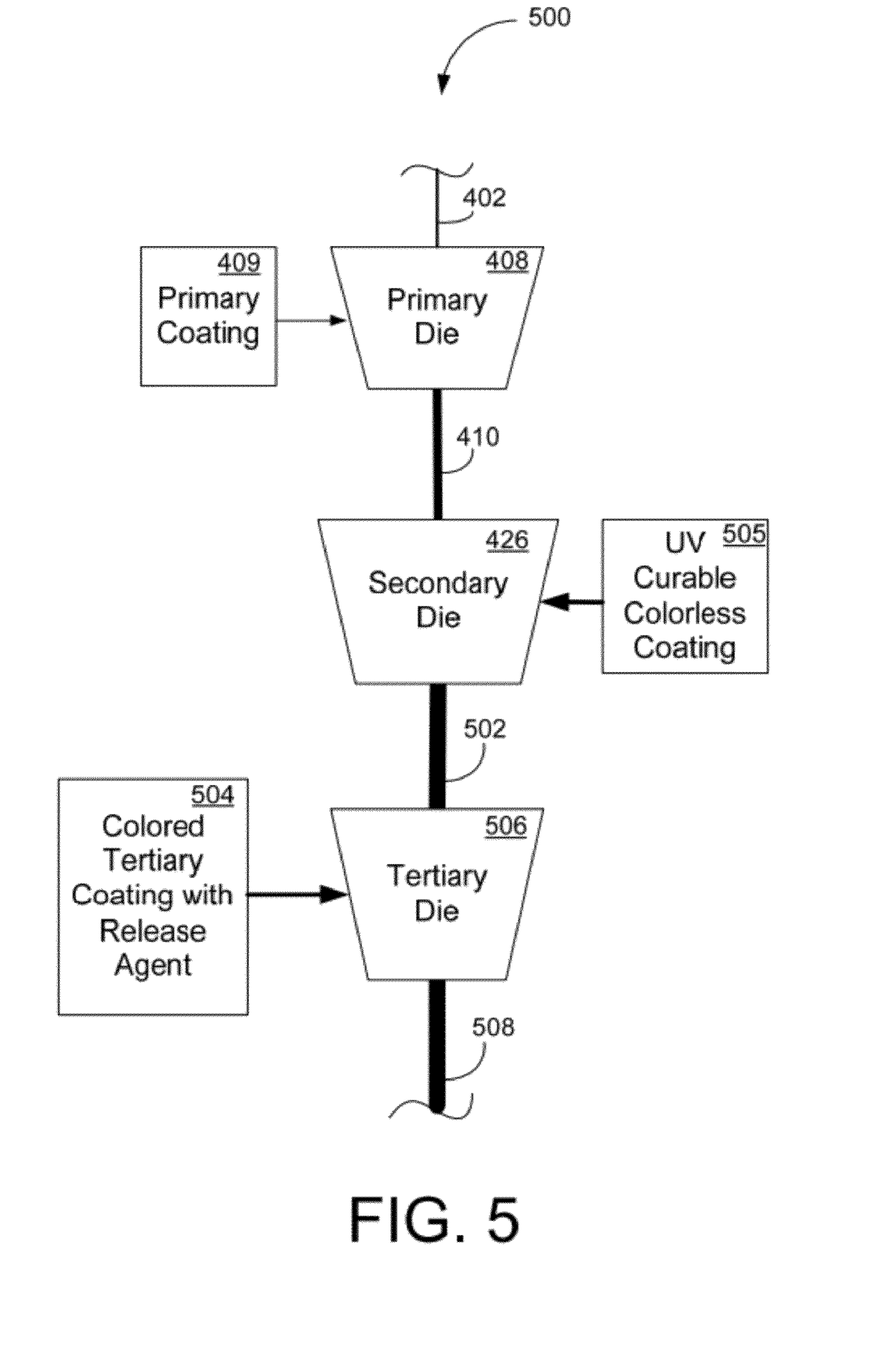
FIG. 5 is a block diagram of another illustrative fiber coating system, according to an example embodiment of the invention.

FIG. 5 depicts an in-line primary, secondary, and tertiary coating system 500, according to example embodiments of the invention. This example embodiment of the system 500 may include a drawn optical fiber core 402 that may be coated with a colorless primary coating 409 using a primary coating die 408. The resulting drawn fiber 410 with a primary coating may then enter the secondary coating die 428 to be covered with a UV curable colorless coating 505 to produce a drawn fiber 502 with a colorless primary coating surrounded by a colorless secondary coating. According to example embodiments, the in-line primary, secondary, and tertiary coating system 500 may include a container or pressurized vessel containing a colored tertiary coating with a release agent 504 that may be applied over the fiber 502 with a colorless primary and secondary coating by a tertiary coating die 506. System 500 may produce a drawn fiber with colorless primary surrounded by a secondary coating, with the secondary coating surrounded by a colored tertiary coating 508. By selectively controlling the application of the colored tertiary coating with release agent 504, the example system 500 may allow application of a tertiary color layer with release agent to be selectively applied to fiber secondary coating in-line during draw without having to interrupt the draw process.

According to embodiments of the invention, the example coating systems 400 500 may include one or more UV curing oven or lamp stages for converting the substantially liquid coatings to substantially solid layers for protection and identification of the optical fiber.

Figure 6:
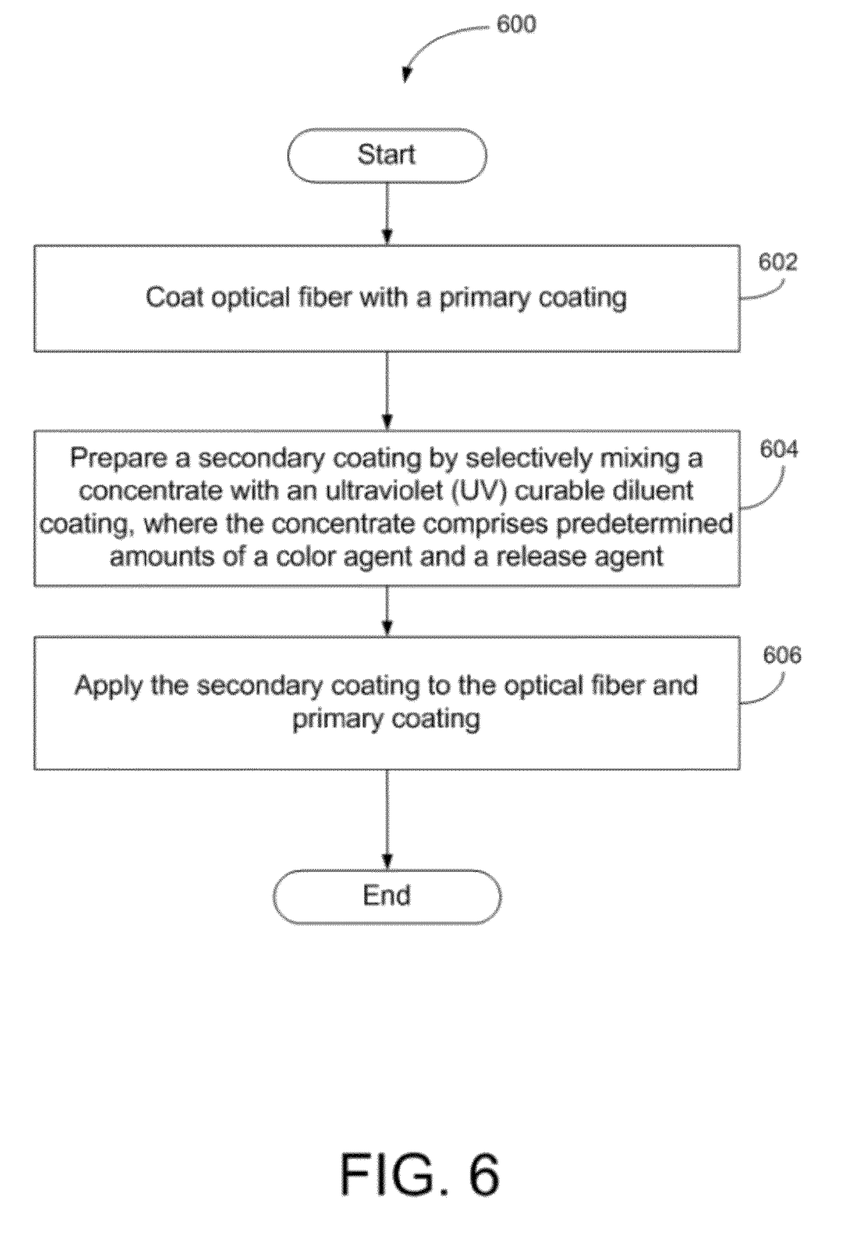
FIG. 6 is a flow diagram of an example method of a fiber process according to an example embodiment of the invention.

An example method 600 for selectively coloring an optical fiber will now be described with reference to FIG. 6. In block 602, and according to an example embodiment of the invention, an optical fiber may be coated with a primary coating. In block 604, and according to an example embodiment, a secondary coating may be prepared by selectively mixing a concentrate with a UV curable diluent coating, where the concentrate comprises predetermined amounts of color agent and release agent. In block 606, according to an example embodiment, the secondary coating is applied to the optical fiber and primary coating.

The example method 600 advantageously provides a method for producing optical fiber with a secondary coating that can selectively be colored or colorless. The example method 600 allows for a color concentrate with a predetermined amount of the release agent or slickness additive to mix with a UV curable diluent coating, when selected, to produce colored optical fiber having sufficient slickness additive (after dilution with the colorless UV curable diluent coating) that the coated fiber can be released from a ribbon matrix. Furthermore, according to an example embodiment, if colorless fiber is desired, then the flow of color concentrate with release agent can be stopped and the secondary coating can be made from UV curable diluent without color or release agent. One advantage of this example method is that the colorless fiber (made without concentrate having color and release agent) may be subsequently colored with a tertiary coloring layer, and the colored tertiary layer may adhere to the colorless secondary layer. Another advantage of this example method is that the concentrated release agent does not need to be present in the UV curable diluent.

Accordingly, example embodiments of the invention can provide the technical effects of creating certain systems and methods that provide for selectively coloring optical fiber. Example embodiments of the invention can provide the further technical effects of selectively producing either colored optical fiber with a slick surface, or colorless optical fiber without a slick surface so that it may be colored off line. In example embodiments of the invention, the in-line primary and secondary coating system 400 and the in-line primary, secondary, and tertiary coating system 500 may include any number of software applications that are executed to facilitate any of the operations.

In example embodiments, one or more I/O interfaces may facilitate communication between the in-line primary and secondary coating system 400, the in-line primary, secondary, and tertiary coating system 500, and one or more input/output devices. For example, a programmable logic controller, a universal serial bus port, a serial port, a disk drive, a CD-ROM drive, and/or one or more user interface devices, such as a display, keyboard, keypad, mouse, control panel, touch screen display, microphone, etc., may facilitate user interaction with the in-line primary and secondary coating system 400 or the in-line primary, secondary, and tertiary coating system 500. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the in-line primary and secondary coating system 400 or the in-line primary, secondary, and tertiary coating system 500 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network, any wired network, any wireless network, etc., for communication with external devices and/or systems.

As desired, embodiments of the invention may include the in-line primary and secondary coating system 400 and the in-line primary, secondary, and tertiary coating system 500 with more or less of the components illustrated in FIGS. 4 and 5.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. An optical fiber comprising:
   an optical core;
   a primary coating covering the optical core; and
   a secondary coating covering the primary coating, wherein the secondary coating comprises a color concentrate and a UV curable diluent coating, wherein the color concentrate comprises a release agent in the amount of about 20% to about 40% by weight of the release agent effective for creating a slick outer service of the optical fiber;
   wherein the concentrate comprises a coloring agent in the amount of about 20% to about 50% by weight and effective for coloring the optical fiber.

2. The optical fiber of claim 1, wherein the secondary coating comprises the concentrate in an amount of about 20% to about 30% concentrate by weight.

3. The optical fiber of claim 1, wherein the primary coating is UV curable.

4. The optical fiber of claim 1, wherein the release agent comprises one or more of silicone acrylates, silicone oils, fluorocarbons, fluorocarbon oils, or fluorocarbon acrylates.

5. A radiation-curable color concentrate for mixing with a secondary coating material and for coating an optical fiber, the concentrate comprising:
   about 20% to about 50% by weight of a coloring agent effective for coloring the optical fiber;
   about 20% to about 40% by weight of a release agent effective for creating a slick outer surface on the optical fiber; and
   about 20% to about 50% by weight of a UV curable diluent coating material effective as a base for the coloring agent and the release agent.

* * * * *